United States Patent
Boyer et al.

(10) Patent No.: US 9,218,324 B2
(45) Date of Patent: *Dec. 22, 2015

(54) METHOD OF ENCAPSULATING DIVERSE USER INTERFACE COMPONENTS WHILE CONSISTENTLY ENFORCING EXTERNAL CONSTRAINTS

(71) Applicant: International Business Machines Corporation, Armonk, NY (US)

(72) Inventors: John Michael Boyer, Victoria (CA); Wayne Allan Malkin, Edmonton (CA); Brent Alexander Taylor, Spruce Grove (CA)

(73) Assignee: International Business Machines Corporation, Armonk, NY (US)

( * ) Notice: Subject to any disclaimer, the term of this patent is extended or adjusted under 35 U.S.C. 154(b) by 243 days.

This patent is subject to a terminal disclaimer.

(21) Appl. No.: 13/917,445

(22) Filed: Jun. 13, 2013

(65) Prior Publication Data

US 2014/0019834 A1    Jan. 16, 2014

Related U.S. Application Data

(63) Continuation of application No. 13/549,109, filed on Jul. 13, 2012.

(51) Int. Cl.
*G06F 17/00* (2006.01)
*G06F 17/21* (2006.01)
(Continued)

(52) U.S. Cl.
CPC .......... *G06F 17/212* (2013.01); *G06F 17/2247* (2013.01); *G06F 17/243* (2013.01); *G06F 17/30893* (2013.01)

(58) Field of Classification Search
CPC ........................ G06F 17/2247; G06F 17/30896
See application file for complete search history.

(56) References Cited

U.S. PATENT DOCUMENTS 7,130,812 B1 * 10/2006 Iyer et al. ............... 705/7.11
7,546,576 B2    6/2009 Egli
(Continued)

FOREIGN PATENT DOCUMENTS

EP    1821203    8/2007

OTHER PUBLICATIONS

Boyer, "Advanced Case Management and the new IBM Forms Release", developerWorks—IBM Forms and Smarter Web Applications, Dec. 21, 2011, whole document, retrieved online on Sep. 10, 2013 from https://www.ibm.com/developerworks/community/blogs/JohnBoyer/entry/advanced_case_management_and_the_new_ibm_forms_release27?lang=en.

*Primary Examiner* — Laurie Ries
(74) *Attorney, Agent, or Firm* — Gates & Cooper LLP

(57) ABSTRACT

A computer-implemented method, apparatus, and computer readable storage medium encapsulate user interface components that collect data for a case management solution, while consistently enforcing metadata and constraints. Multiple types of interactive documents are supported, and a configuration indicates the type whose user interface components are to be encapsulated. A wrapper widget is created based on the interactive document type and implements an interface that enables it to interact externally with the case management environment and internally with the interactive document. The wrapper widget injects case property data values, metadata and/or constraints from the case management environment into the interactive document, which then enables editing of the case property data values and the effecting of the metadata and/or enforcing of the constraints. The wrapper widget is responsive to requests from the case management environment to validate and persist the interactive document to a case of the case management solution.

8 Claims, 5 Drawing Sheets

(51) Int. Cl.
*G06F 17/22* (2006.01)
*G06F 17/24* (2006.01)
*G06F 17/30* (2006.01)

(56) References Cited

U.S. PATENT DOCUMENTS

| | | |
|---|---|---|
| 7,644,351 B1 | 1/2010 | Portnoy et al. |
| 8,196,112 B1 * | 6/2012 | Cansizlar ................ 717/126 |
| 2004/0111696 A1 * | 6/2004 | Soroker et al. ............ 717/101 |
| 2006/0031749 A1 * | 2/2006 | Schramm et al. ........ 715/500.1 |
| 2006/0036634 A1 | 2/2006 | Kristiansen et al. |
| 2006/0150107 A1 | 7/2006 | Leung et al. |
| 2006/0168536 A1 * | 7/2006 | Portmann .................... 715/762 |
| 2007/0101433 A1 * | 5/2007 | Louch et al. ................ 726/25 |
| 2009/0031226 A1 * | 1/2009 | Zhang et al. ................ 715/762 |
| 2009/0183063 A1 | 7/2009 | Malkin et al. |
| 2009/0249282 A1 | 10/2009 | Meijer et al. |
| 2010/0262626 A1 | 10/2010 | Abbondanzio et al. |
| 2011/0214078 A1 * | 9/2011 | Klask et al. ................ 715/763 |
| 2012/0137227 A1 | 5/2012 | Gerken, III et al. |
| 2012/0158516 A1 * | 6/2012 | Wooten et al. ............ 705/14.66 |
| 2012/0174002 A1 * | 7/2012 | Martin et al. .............. 715/763 |

* cited by examiner

METHOD OF ENCAPSULATING DIVERSE USER INTERFACE COMPONENTS WHILE CONSISTENTLY ENFORCING EXTERNAL CONSTRAINTS

CROSS-REFERENCE TO RELATED APPLICATION

This application is a continuation of the following co-pending and commonly-assigned patent application:

U.S. Utility patent application Ser. No. 13/549,109, filed on Jul. 13, 2012, by John M. Boyer, Wayne A. Malkin and Brent A. Taylor, entitled "METHOD OF ENCAPSULATING DIVERSE USER INTERFACE COMPONENTS WHILE CONSISTENTLY ENFORCING EXTERNAL CONSTRAINTS,";

which application is incorporated by reference herein.

BACKGROUND OF THE INVENTION

1. Field of the Invention

The present invention relates generally to managing and displaying casework data, and in particular, to a computer-implemented method, apparatus, and computer readable storage medium for encapsulating diverse user interface components while consistently enforcing external metadata and constraints for the components. In addition, the present invention relates to the field of case management in which data is collected from one or more users according to a pattern orchestrated by a case solution.

2. Description of the Related Art

An industry solution is an information technology (IT) asset that helps solve an industry-specific problem and is easily reconfigurable to meet specific needs of each client. A solution often helps a client to reach out to and interact with their own customers or users.

An important segment within industry solutions is called case management, which takes the view that a customer/user interaction pattern can be orchestrated by a case. The definition of a case includes data structure and data type definitions, metadata and validation constraint definitions, business process and user access rules, and other possible resources. Each piece of data in a case is called a case property, which consists of a name and a value. A case property can be part of the information collected for a case, and it may also be used in decision logic of business process rules. Metadata for a case property can include information about the case property such as whether it is read-only or hidden. A validation constraint may be as simple as requiring the case property value to be a particular data type, such as a number, or it could be a range constraint, such as an upper or lower numeric bound, on the case property value.

Based on an initial request by a customer or user, the case management system instantiates the case definition, and the resultant case orchestrates the interaction to achieve the goal or goals implicit in the defined pattern. For example, a case management system could be used to orchestrate the means by which a customer makes and successfully completes a warranty claim for a defective product. The process would begin with collecting initial information about the defective product, about the defect, and about the purchase. The process would include determining the legitimacy of the warranty claim, providing basic support to qualify the defect and determine a course of action, and ultimately to effect a repair or replacement of the product.

A case management user interface is a collection of interactive components that collect data from a user and store it in the data structure of a case (an instance of a case definition). The presentation of the user interface is also affected by the metadata of the case. A common piece of metadata is an enumeration of the valid values that a data item may take. If such a list is available, then it would be presented in a drop-down menu or list box, and the input would be collected via list selection rather than by free-form typing in a text entry field. Other common metadata includes Boolean flags such as for indicating whether a data node is read-only or required to fill in a step of the case processing. The user interface components would be affected by enforcing the read-only property or providing a sensory indication of the required property. Still other metadata can define validity constraints, such as a numeric data type or a minimum or maximum value or length. The user interface of a component associated with a data node would be affected by indicating whether the current data value is or is not valid according to the constraints. A case management asset would also typically forbid progress to the next step of the orchestrated pattern when the data associated with the current step contains invalid values.

The term "case management solution" has been used to describe a software solution that supports the design, deployment, execution and reconfiguration of case management assets. As the field of case management matures, the term "advanced case management" has emerged as a way to characterize case management assets that have advanced feature requirements, such as the requirement to collect many dozens, scores or hundreds of fields of data. Some examples of advanced case management include: home or car insurance claims, credit card charge dispute resolution, citizen-facing ombudsperson cases, contagious disease outbreak tracking, and management of complex medical or psychological treatment cases. IBM Case Manager™ (ICM) is one product entry in the field of advanced case management solutions.

A problem arises in advanced case management solutions with respect to the expected maturity of the user interface. The typical case management solution generates a user interface presentation layer (herein called a Case Data widget) for the data of a step using a simple linear columnar approach or a column of expandable stacks of related data values. The advantage of this approach is that it most easily adapts to a reconfiguration of the case management asset in which the data structure is amended to add or remove data nodes.

However, there are a number of disadvantages to this approach. For one, it provides a one-size-fits-all approach to the user interface layout in which usability substantially degrades in quality as the size of the data set grows. As well, larger data sets tend to correlate to more advanced requirements in an overall solution that a case management asset simply cannot begin to address using only a simple user interface approach.

Accordingly, a critical feature in the user interface is the ability to display and interact with data fields representing case properties or tasks. A variety of configurable field layout widgets is desired, where the designer of an end solution can select an appropriate tool for each user interface page based on the complexity of the interface (number of fields, interactions between fields, and so on), the complexity of external interactions (events between components, interactions with databases, interactions between field, etc.), and the flexibility needed in expressing the user interface including internal constraints (e.g., the number of fields, interactions between fields, layout of fields, ordering, dynamic elements, etc.).

A form is a kind of interactive document that combines a data structure with a template describing interaction behavior rules and a comprehensive user interface definition. The document processor of a form is a software system that an end-user interacts with via the defined user interface and according to behavioral rules. Data from the end-user is collected with the user interface and stored in the data structure of the form.

Forms documents focus on structured data collection. Examples include FileNet P8 eForms, IBM Forms, and PDF Forms. Other examples of interactive documents are spreadsheets and word processing documents, in proprietary formats or ODF (open document format). These documents can collect data in the context of "unstructured" content, such as fill-in-the-blanks components within the free-flowing text of a textual contract, or semi-structured content, such as spreadsheets that combine explanatory text cells with data input and calculations needed for expense reports or sales projections.

In a prior release of an advanced case management solution, one version of a forms technology was incorporated into the case definition facility. The solution was the IBM Case Manager, and the forms technology was FileNet P8 eForms. By including a P8 eForm in the case management assets, it became possible to present a reasonably high-precision user interface layout for data collection, as an alternative to the default simple user interface approach.

However, a disadvantage of this approach is that a number of advanced requirements could not be met using only the one interactive document technology because no single technology is intended to provide all the interactive document features that may be needed across the wide range of solutions that fit the general case management pattern.

In the above mentioned incorporation of a forms technology into an advanced case management solution, a second disadvantage was that the focus of the incorporation was on providing an alternative means of defining the user interface layout. However, the metadata components of the case management asset were not accommodated, leading to duplication of interaction behavior rules in order to ensure consistent behavior between the form interface and the simple data user interface.

In view of the above, there are two primary problems in the prior art. First is the development of a user interface abstraction that allows many diverse user interface tools to be applied. Second is a mechanism for consistently enforcing system behaviors that are expressed in the very complex environment that surrounds and backs the user interface. An important aspect of this is enforcing system constraints, such as allowed ranges, choice lists, and so on, where the user interface tools may or may not support the full set of system constraints.

Existing solutions are generally purpose built, and are limited by system capabilities and the time available to build new components. For example, in ICM 5.0™ (available from the assignee of the present invention), a simple field layout widget was provided. This Case Data widget provides a good expression of the system constraints since it was designed with the overall ICM system in mind. However, the widget is very limited in its ability to interact with other systems or to provide a more customized user interface.

SUMMARY OF THE INVENTION

Embodiments of the invention provide an abstract user interface widget (referred to herein as the Case Interactive Document Rendering widget) that interacts with the ICM provided environment externally, and with a variety of user interface design options internally. In embodiments of the invention, the Case Interactive Document Rendering widget can also be used as a direct replacement for the Case Data widget of a case management solution. Within the Case Interactive Document Rendering widget, different interactive document rendering technologies can be used (user configurable), such as P8 eForms and IBM™ Forms. P8 eForms and IBM™ Forms are electronic forms management applications that supply developers with out-of-the-box components that can be modified to create custom forms or workflows for use in custom web applications. Other interactive document formats can be rendered within the Case Interactive Document Rendering widget by using wrapper widgets that implement a common interface according to the specific interactive document format.

Within the Case Interactive Document Rendering widget, case properties, metadata and constraints of a case management solution are fully supported. ICM provides a rich set of configurable metadata and constraints, such as whether a case property is read-only, hidden or of a particular data type. These metadata and constraints may or may not map to similar capabilities in the specific user interface technology applied (P8 eForms or IBM™ Forms in the example given). Some metadata and constraints of the system are directly transferred to the rendered user interface (UI), when possible, and others are maintained and enforced in the wrapping widget. This provides three key benefits:

(1) A very high level of compliance is maintained with the case property metadata and constraints, even when the user interface definition is rendered outside of the case management system;

(2) Where possible, the case property metadata and constraints are expressed directly in the user interface definition (such as a form) where the user will get the most immediate feedback during interactive rendition of the user interface; and (3) This blended approach allows case management solutions to exploit capabilities related to metadata and constraints that may be unique to either the user interface definition tool or the case management system. For example, the user interface definition tool may allow metadata and constraints to be computationally determined based on values of other case properties or data internal to the user interface definition. This capability could be exploited to create more dynamic user interface behaviors, while still effecting metadata and constraints transferred from the case management solution into the interactive rendition of the user interface. Similarly, new case management system capabilities can be invoked by the wrapper widget without impacting the interactive rendition behavior of the user interface definition in the interactive document.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

In general, embodiments of the invention provide the incorporation of any number of diverse interactive document technologies into a case management asset. When utilized with form technologies (e.g., the P8 eForms technology and/or the IBM Forms technology), the incorporation may be performed using a Case Interactive Document Rendering widget.

One advantage of such an approach is that it allows unique features of a new or different interactive document technology to be exploited. For example, whereas P8 eForms may have been used in a case management solution, the ability to switch over to using IBM Forms enables the use of features unique to the IBM Forms technology, including the ability to dynamically hide any portion of the user interface and the ability to produce a "document of record" for the interaction represented by the case. Such a document could be digitally signed or printed, thereby enabling satisfaction of legal or auditability requirements. Another advantage is that the IBM Form template is instantiated as a document that contains the data collected, whereas P8 eForms are only templates whose connection to the data only occurs during execution of the form within the case management solution. Therefore, an IBM Form can be presented outside of the context of the original case management solution, where it can collect data needed to initiate a case. These are simply some of the specific features of an alternative interactive document technology that illustrate the advantage of being able to incorporate multiple such technologies to access the advanced features of each.

In view of the above, embodiments of the invention provide for integrating a plurality of document technologies. Such integration may be performed with IBM Forms documents that are based on the XForms standard. Further, the XForms model component is also available in ODF wordprocessing and spreadsheet documents. The IBM Forms integration may also be based on the injection of both data and metadata into the XForms model of the IBM Forms, and therefore essentially the same machinery can activate ODF wordprocessing and spreadsheet documents within an advanced case management solution.

In addition, embodiments of the invention overcome the disadvantages of prior systems. More specifically, embodiments of the invention are based on integration of not only the data layer but also the metadata layer so that the user interface provided by the interactive document technology has behaviors on par with the expectations laid out in the case management asset.

Hardware Embodiment Overview

Figure 1:
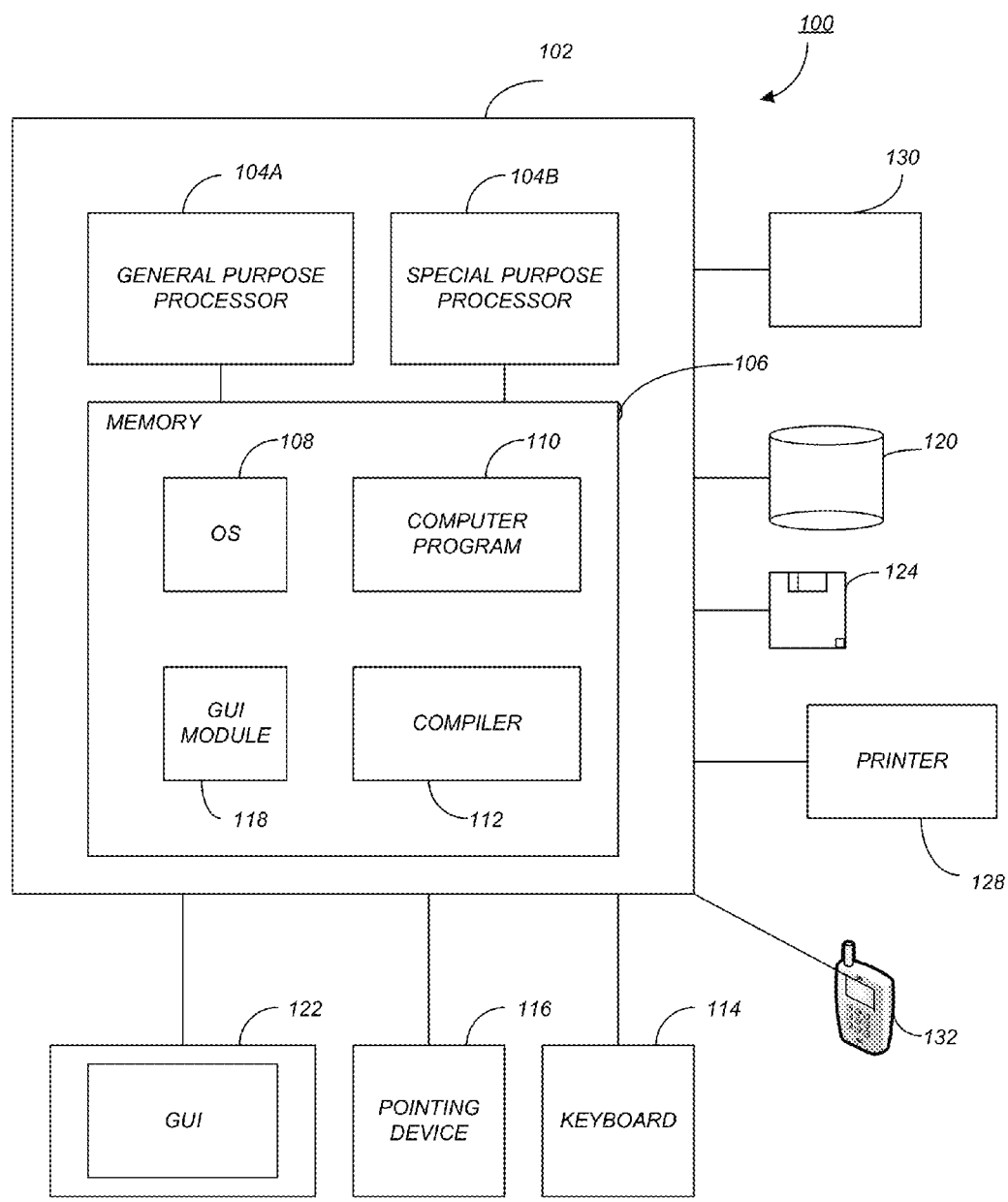
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transient computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
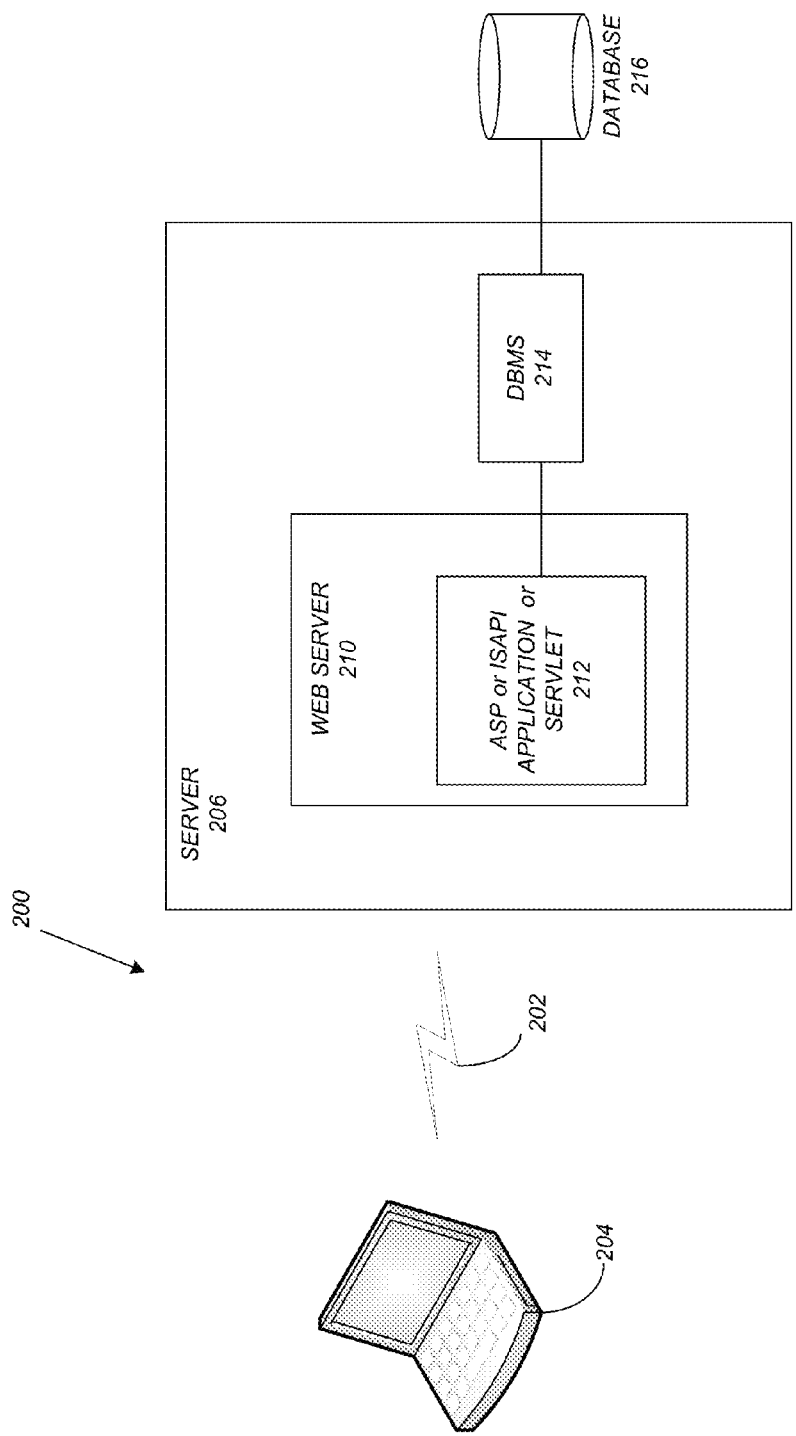
FIG. 2 schematically illustrates a typical distributed computer system using a network to connect client computers to server computers in accordance with one or more embodiments of the invention.

FIG. 2 schematically illustrates a typical distributed computer system 200 using a network 202 to connect client computers 204 to server computers 206. A typical combination of resources may include a network 202 comprising the Internet, LANs (local area networks), WANs (wide area networks), SNA (systems network architecture) networks, or the like, clients 204 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect client computers 204 and servers 206 in accordance with embodiments of the invention.

A network 202 such as the Internet connects client computers 204 to server computers 206. Network 202 may utilize ethernet, coaxial cable, wireless communications, radio frequency (RF), etc. to connect and provide the communication between clients 204 and servers 206. Client computers 204 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, etc. Further, the software executing on client computers 204 may be downloaded from server computer 206 to client computers 204 and installed as a plug-in or ACTIVEX™ component of a web browser. Accordingly, client computers 204 may utilize ACTIVEX™ components/component object model (COM) or distributed COM (DCOM) components to provide a user interface on a display of client computer 204, or client computers 204 may simply use HTML, CSS and Javascript features of the web browser to provide a user interface on a display. The web server 210 is typically a program such as IBM WEBSPHERE APPLICATION SERVER™ or MICROSOFT'S INTERNET INFORMATION SERVER™.

Web server 210 may host a Java™ Servlet, an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. In embodiments of the present invention, a business object may implement a generic processor such as content engine 320 or process engine 322 (see description of FIG. 3 below).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 102, 204, and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 102, 204, and 206.

Software Embodiment Overview

Embodiments of the invention are implemented as a software application on a computer 102 (e.g., client computer 204 or server computer 206). Further, as described above, the client computer 204 or server computer 206 may comprise a thin client device or a portable device that has a multi-touch-based display.

As described above, embodiments of the invention provide an abstract user interface widget referred to as the Case Interactive Document Rendering widget that interacts with a case management environment externally, and with a variety of user interface design options internally.

Figure 3:
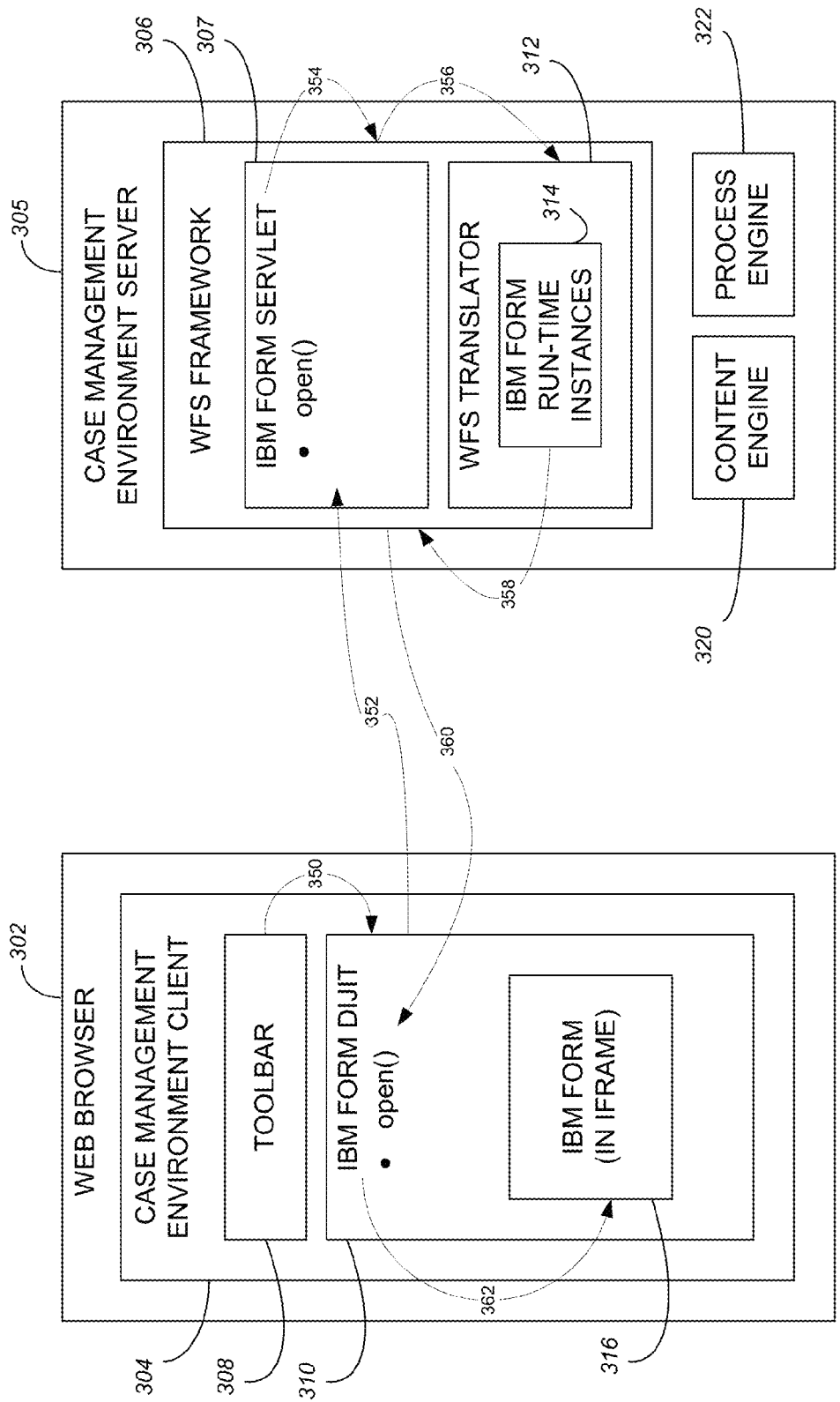
FIG. 3 illustrates the primary components used as well as key operational steps that occur while opening a form in accordance with one or more embodiments of the invention.
Figure 4:
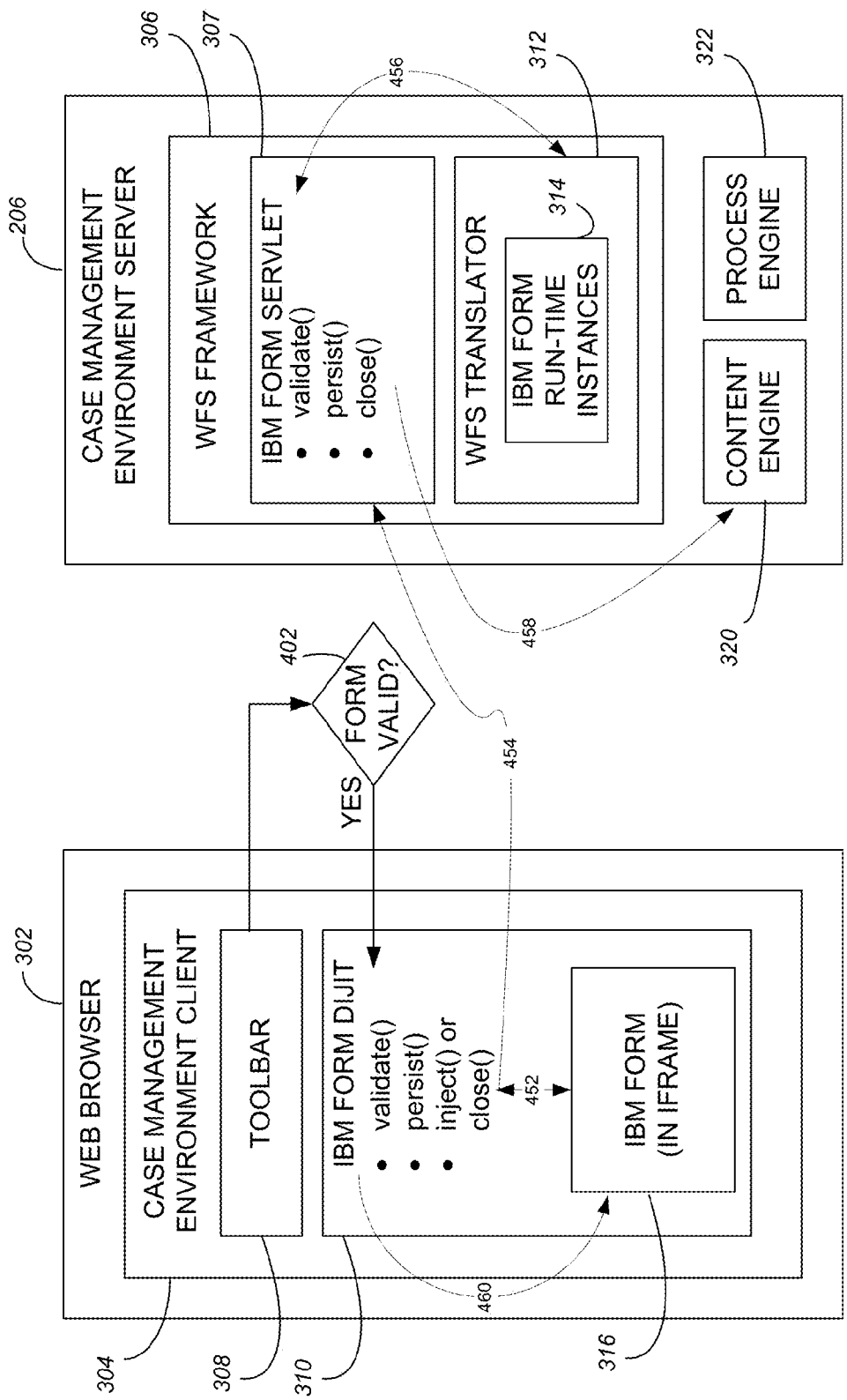
FIG. 4 illustrates the operation sequence that occurs when a data collection task is completed successfully with a form in accordance with one or more embodiments of the invention.

FIG. 3 illustrates the primary components used as well as key operational steps that occur while opening a form in accordance with one or more embodiments of the invention. Similarly, FIG. 4 illustrates the operation sequence that occurs when a data collection task is completed successfully with the form in accordance with one or more embodiments of the invention. As described above, a web browser 302 within a client computer 204 may communicate with a server computer 206 (e.g., a Case Management Environment Server 305). Further, to provide an interactive document, multiple different technologies may be used. One such technology is that of FileNet P8 eForms. To enable the use of IBM Forms as an alternative interactive document technology, the web browser 302 may provide a Case Management Environment Client 304 that is used to interact with a servlet equipped with the IBM Forms Webform Server (WFS) framework 306. Details regarding the different components and methods illustrated in FIGS. 3 and 4 are described below.

1. Common Components

Each form platform (e.g., P8 eForms, IBM™ Forms, or others) uses its own servlet 307 (e.g., executing within Case Management Environment Server 305) to render and manage form state. A common FormService class may be provided to manage common operations such as the retrieval or persistence of form content or the parsing and injection of case properties, metadata and constraints into the form. The delegation pattern is applied to allow each form platform to handle form injection events in a manner appropriate to the platform.

Embodiments of the invention create an AbstractForm dijit class as an abstraction of the various form-related operations. As used herein, dijit is a user interface library that provides widgets and functionality for a developer to create a user interface. Among other features, the AbstractForm dijit class interface supports "open", "inject" and "validate" methods each triggered directly or indirectly by ICM events. Additional common methods are provided to manage the parsing and injection of form data and metadata (or external constraints). The delegation pattern is applied to allow each form platform to handle form data and metadata injection or validation events in a manner appropriate to the platform.

2. Initial Rendering

A user may first be presented with a web browser 302 that contains a toolbar 308 or other buttons/menu options. The process begins when a user selects an "open" button to open/create a form. The Case Management Environment Client 304 determines the interactive document type to open based on the configuration of the case management solution being presented. Hereafter in this description, it is assumed that the case management solution is configured to open an IBM Forms document. At 350, the selection of the "open" button creates a wrapper widget for the interactive document to be opened. In one embodiment, the wrapper widget is implemented with Form Dijit 310 and a Form iframe 316 (e.g., Form iframe). The Case Management Environment Client 304 invokes the open( ) method of the wrapper widget. The invocation includes a request 352 for the form that is transmitted to the servlet 307 that executes within the Case Management Environment Server 305. In this regard, for the extended Form Dijit 310, the "open" method includes the case properties, metadata and constraints in the parameters passed 352 to the servlet 307 for the initial form rendering. (It may be further noted that the Case Management Environment Client 304 previously obtained the case properties, metadata and constraints from the Case Management Environment Server 305, where they are stored in content engine 320 [and where some case properties may be stored as business process variables in process engine 322]). At the server 305, the FormService component (i.e., servlet 307) also determines the interactive document type to open based on the configuration of the case management solution. The FormService component (i.e., servlet 307) parses the case data, metadata and constraints and fires server-side injection events for each value, metadata and constraint into the interactive document being initialized for rendition. In the case of an IBM Forms document, for each metadata and constraint, an XForms "bind" object is created to effect that metadata or enforce that constraint within the XForms model. Accordingly, at 354, the open( ) method executing in servlet 307 initializes the IBM Forms document by opening an XFDL (XML format of an IBM Form) form, injecting data, choice lists, metadata and constraints into the form, serializing the XFDL to output a stream 356, and destroying the run-time instance of the XFDL form in servlet 307, (which is no longer needed as the information is serialized into the output stream 356).

If the web browser 302 is equipped with an IBM Forms Viewer module, such as a plug-in or ACTIVEX™ component, then the XFDL serialization is returned 358 to the output stream. The servlet base class implementation of WFS framework 306 delivers 360 the output stream content (the XFDL) to the IBM Form dijit 310. Otherwise, if the web browser 302 in not equipped with an IBM Forms Viewer module, then the XFDL on the output stream is then passed, at 356, to the WFS Translator 312. The WFS Translator 312 instantiates the XFDL form within its collection of Form run-time instances 314, and then replaces 358 the XFDL on the servlet 307 output stream with one page of HTML (hypertext markup language). The WFS framework 306 then passes 360 the HTML for one page of XFDL to the Form Dijit 310 executing the open( ) operation.

The form 316 is then rendered (e.g., the XFDL or HTML is sent 362 to an iframe 316 for user interaction).

For the P8 eForms wrapper widget, as implemented by the extended FilenetForm dijit 310, the "open" method omits the case properties, metadata and constraints from the parameters passed 352 to the server, opting instead to inject them in the client implementation (see below). The form 316 is simply rendered without the case data and metadata. After the form 316 is rendered, the case properties, metadata and constraints are injected into the form via the "inject" method (see below).

3. Dynamic Injection

The "inject" method is called to inject 354 at least one of a new case property list, a new case property metadata list and a new case property constraint list into the form 316 after its initial rendering.

For the IBM Forms wrapper widget, the extended IBM-Form dijit 310 has an "inject" method that is invoked, the implementation of which depends on whether or not the web browser 302 is equipped with the IBM Forms Viewer. If web browser 302 is equipped with the IBM Forms Viewer, then its dynamic injection method is invoked. Otherwise, if web browser 302 is not equipped with the IBM Forms Viewer, then the inject method performs an AJAX (asynchronous JavaScript™ and XML [extensible markup language]) call to the IBM Forms servlet 307 running within server 305. The handler in servlet 307 for the AJAX call invokes a dynamic injection method of WFS Translator 314 on the XFDL form within the IBM Forms Run-time Instances 314. The dynamic injection method creates or updates data elements in XForms "instance" objects to change case property values based on the values in the new case property list and choice list metadata based on updated choice list in the new case property metadata list, and it creates or updates XForms "bind" objects in the XFDL form to effect other new metadata settings from the new case property metadata list and to enforce new constraints from the new case property constraint list. If the dynamic injection method of the WFS Translator 314 was invoked, then the WFS Translator 314 formulates a JSON representation of the changes resulting from the injection and returns the JSON representation as the result of the AJAX call. The IBMForm dijit 310 uses the JSON representation of the changes to update the form 316 rendering.

For the P8 eForms wrapper widget, as implemented by the extended FilenetForm dijit 310, the "inject" method 356 invokes the common data and metadata injection method and provides handlers for the various injection events. These event handlers cache event metadata (see below) and call the P8 eForms JavaScript API to update the form state as required. It may be noted that certain external constraints, such as minValue, maxValue, maxLength and hidden may not be supported.

4. Validation

Once the data collection task is completed successfully with the form 316, there is a need to validate the form and persist the data in the form. FIG. 4 illustrates such a process. Accordingly, if a "complete" button on toolbar 308 is selected, persist( ) and close( ) methods may be invoked if the form is determined to be valid (i.e., if a validate( ) method is true).

Accordingly, once the form is complete, a determination is made at 402 regarding whether the form is valid. To perform such a determination 402, the "validate" method is called to determine the valid state of the form 316. The validate method may be called to determine the initial view/edit state of the form 316. The validate method is always called prior to a completion save operation (i.e., persisting the case property data values responsive to a user indicating completion of a business process step of the case management solution). The validate method may or may not be called prior to an intermediate save operation (i.e., persisting the case property data values responsive to a user indicating a termination of the data collection experience without completion of a business process step, such as for the purpose of continuing at a later time or date). The "validate" method reports the list of case properties validated, the valid state and an optional error message.

For the extended IBM Form Dijit 310, the "validate" method 402 ensures that the value in the focused user interface element of IBM Form 316 is committed to the XFDL form run-time instance, which is either in the IBM Forms Viewer or in IBM Form Run-time instances 314. In both cases, the committed value triggers a notification to the Case Management Environment Client 304 that provides the new value for the case property associated with the focused user interface element. If the web browser 302 is equipped with the IBM Forms Viewer, then its validation method is invoked. Otherwise, IBM Form Dijit 310 performs an AJAX call to the validation method of the IBM Form servlet 307 to inquire the valid status of the XFDL form in IBM Form Run-time Instances 314. In both cases, the IBM Forms validation method evaluates each non-hidden form field against the current set of "bind" objects that represent constraints to determine the valid status. The Case Management Environment Client 304 may also validate constraints on the values of case properties that are hidden by form 316.

For the extended FilenetForm dijit 310, the "validate" method 402 commits the current cell and calls the P8 eForms JavaScript API to determine the valid state of the form 316. Since the P8 eForms JavaScript API may only support a subset of the defined external constraints, additional validation may be performed against the remaining constraints by the Case Management Environment Client 304.

The result of the validation method is a list of case properties that have invalid values. The form 316 is valid if the invalid case property list is empty. In this case, if the web browser 302 is equipped with the IBM Forms Viewer, then the XFDL serialization is obtained 452 from the IBM Forms Viewer (i.e., from the viewer rendered within the iframe 316). Thereafter, the persist( ) method of the wrapper widget, i.e. Form Dijit 310, is invoked. In an exemplary embodiment, the wrapper widget has at all times a case property list containing the name and latest value of all case properties changed within the interactive document. The wrapper widget implementation does this by setting up a change listener on the interactive document to receive a change event for each case property value change, if the interactive document technology supports change listeners. In an alternative embodiment, the wrapper widget can construct a resultant case property list by requesting the latest value of each case property from the interactive document. In an alternative embodiment, the resultant case property list is filtered to remove case properties that are identical in name and value to a case property in the originally injected case property list. The wrapper widget then invokes 454 the persist method of the servlet 307, passing it the resultant case property list.

The persist method invocation 454 may also include the XFDL serialization in the POST data if it was obtained from the IBM Forms Viewer (not WFS 306). If there is no XFDL in the POST data, then the servlet 307 may call 456 WFS 306 to retrieve the XFDL. The XFDL form may then be stored/persisted 458 in a content engine 320. Finally, in an exemplary embodiment, the Case Management Environment Client 304 also commits the case property value changes from the resultant case property list to the content engine 320.

Once persisted/saved 458, any "dirty" flag for the form may be cleared 460 by the Form Dijit 310. In addition, step 460 may also include the Case Management Environment Client 304 calling the inject method (e.g., to further update the form with changes made by another user using another client computer 204) or the Case Management Environment Client 304 may invoke 460 the close operation on the form.

Logical Flow

Figure 5:
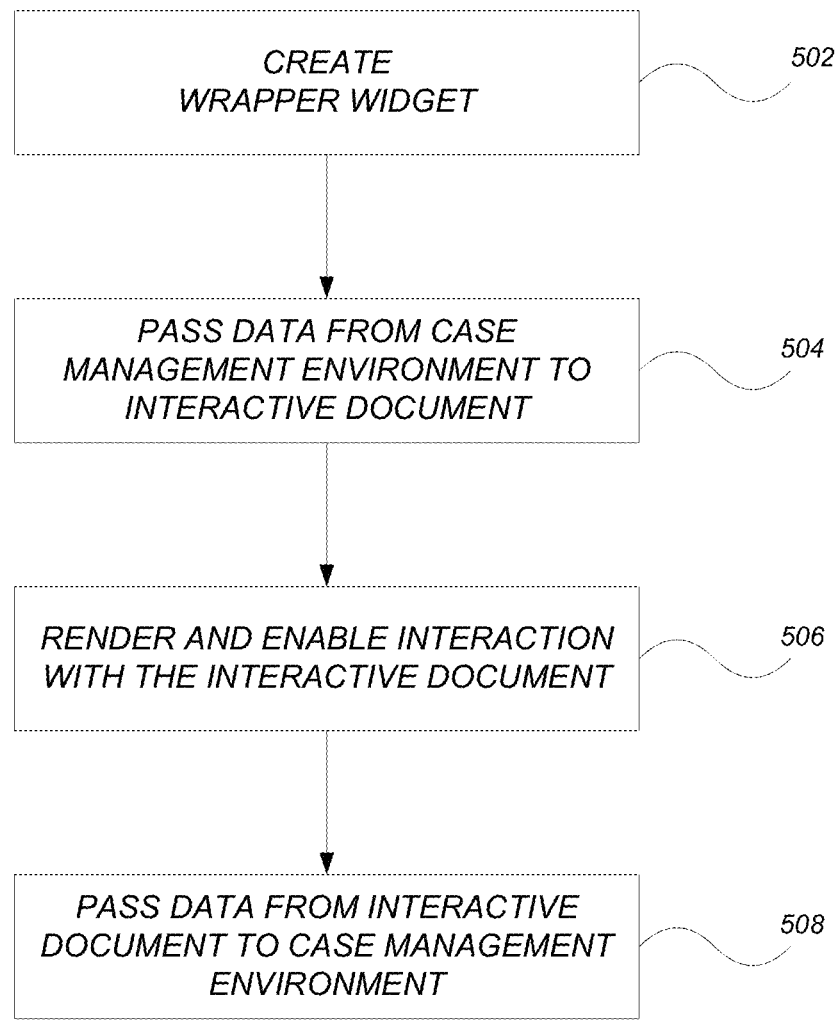
FIG. 5 is a flow chart illustrating the logical flow for encapsulating user interface components in accordance with one or more embodiments of the invention.

FIG. 5 is a flow chart illustrating the logical flow for encapsulating user interface components in a case management environment in accordance with one or more embodiments of the invention.

At step 502, a wrapper widget is created that is appropriate to a type of indicated interactive document. The wrapper widget is an implementation of an abstract user interface widget definition. The abstract widget definition provides an interface that enables the case management environment and wrapper widget to each delegate appropriate functionality to the other side of the system. In other words, the wrapper widget is equipped to render the document within the case management environment. In addition, the wrapper widget is equipped to pass a first case property list and at least one of a case property metadata list and a case property constraint list from the case management environment to the interactive document. The wrapper widget is further equipped to pass at least one of a second case property list and an invalid case property list from the document to the case management environment. The first and second case property lists may be different (e.g., if a case property and/or value has changed) or may be the same (e.g. if the user has not changed anything in the list).

At step 504, the wrapper widget is used to pass a first case property list and at least one of a case property metadata list and a case property constraint list from the case management environment to the indicated interactive document. Such a case property (within the case property list) may have a value that reflects a step of a business process workflow. Further, the document may impose a dynamic rule for a metadata value or a constraint that is associated with the passed case property. In one embodiment, if a metadata value or constraint is also passed to the document, the document may combine the effects, such as ensuring that all constraints are satisfied or that the user interface element behaves in a read-only manner unless both the case management environment and the document's dynamic rule indicate a false read-only metadata value. An alternative embodiment may dynamically inject the first case property list and the at least one of a case property metadata list and a case property constraint list only after initial rendition; this alternative can be regarded as equivalent to providing, in step 504, an empty list for the first case property list and an empty list or lists for the at least one of a case property metadata list and a case property constraint list.

At step 506, the wrapper widget is used to render and enable interaction with the interactive document. The user is enabled to edit the case property values using the user interface components of the interactive document. The user interface components in the document rendition are responsive to at least one of the effects of the case property metadata list and the case property constraint list. In an exemplary embodiment, the interactive document technology supports dynamic injection of at least one of a case property list, a case property metadata list and a case property constraint list subsequent to the initial rendering.

At step 508, responsive to a user request to save the case work or complete the data collection session, the wrapper widget is used to pass at least one of a second case property list (either the same or different from the first case property list) and the invalid case property list from the indicated interactive document to the case management environment. Thereafter, the case management environment may persist, in a content engine or database, the case properties (from the list) subsequent to receiving, from the wrapper widget, an empty invalid case property list. In addition, when the indicated interactive document produces an invalid case property list, at least one property constraint is not enforced (by the interactive document). However, the case property constraint is enforced by the wrapper widget by adding the case property to the invalid case property list (obtained from the interactive document).

In one or more embodiments, the wrapper widget is substituted for a data widget in a case solution of the case management environment. In such a case, the interactive document rendered in the wrapper widget is used to edit the case property values, but the interactive document itself is not persisted, responsive to completion of the data collection session.

Steps 504 and 508 may further provide for a case property value change made from within the interactive document at step 506. In such an exemplary case, a case property having a first value (e.g., X=A) is passed from the case management environment to the interactive document. The interactive document changes the value of the case property to a second value (e.g., from A to B) and then passes the case property with the new value (e.g., X=B) back to the case management environment.

In addition to the above, a digital signature may be created for the interactive document at step 506. Thereafter, the interactive document and digital signature may be persisted within a case of the case management solution. In such an embodiment, the modifiability of a case property is restricted, responsive to the creation of the digital signature, if the digital signature includes in its signed information the form data element associated with the case property.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention unify the run-time operation of at least one interactive document with the run-time operation of a case solution. At a defined point in the operation of a case solution, an interactive document is presented to the user. At least one case property value (i.e. a data value of the case) is injected into the document. Various behavioral descriptors or metadata settings of the case, if any, are also injected and are expected to be enforced by the interactive document processor. This can include data type and data value constraint expressions, as well as requiredness and read-only indicators or conditional expressions, and show/hide indicators or conditional expressions. The interactive document may express further behavioral descriptors that are expected to be merged with those injected from the case solution.

In view of the above, in embodiments of the invention, data value changes and the merged results of the behavioral descriptors are reflected back to the case solution at the key points of the interaction lifecycle, such as when the user attempts to save the document or completes a task of the case solution. Further advantages can be derived from the additional features that an interactive document format brings to the case solution, such as the ability to provide a printable document of record for the transaction represented by the case or the ability to digitally sign the document of record for increased auditability of the case solution as the system of record. The digital signature aspect allows a further advantage related to the restriction of future modifiability of case property values covered by at least one signature.

In summary, embodiments of the invention provide for the creation of a manager that can manage interaction of a customizable set of user interface components with external constraints (such as events between components, interactions with data bases, etc.) as well as internal constraints (such as the number of fields, interactions between fields, etc.).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for encapsulation of user interface components in a case management environment, the computer-implemented method comprising:
   (a) creating a wrapper widget based on the type of an indicated interactive document and an abstract user interface widget definition, wherein:
   (b) passing, using the wrapper widget, a first case property list and at least one of a case property metadata list and the case property constraint list from the case management environment to the indicated interactive document;

(c) rendering, using the wrapper widget, the indicated interactive document;

(d) passing, using the wrapper widget, at least one of a second case property list and an invalid case property list from the indicated interactive document to the case management environment.

2. The computer-implemented method of claim 1, further comprising injecting at least one of a new case property list, a new case property metadata list and a new case property constraint list subsequent to the rendering.

3. The computer-implemented method of claim 1, wherein:

a case property of the first case property list comprises a first value that is passed, using the wrapper widget, from the case management environment to the indicated interactive document;

the indicated interactive document changes the case property to a second value that is passed, using the wrapper widget, from the indicated interactive document to the case management environment.

4. The computer-implemented method of claim 1, wherein:

a case property received by the indicated interactive document from the case management environment comprises a value that reflects a step of a business process workflow.

5. The computer-implemented method of claim 1, wherein the case management environment:

persists, in a content engine or database, a case property subsequent to receiving, from the wrapper widget, an empty invalid case property list.

6. The computer-implemented method of claim 5, wherein:

at least one case property constraint is not enforced by the indicated interactive document when it produces the invalid case property list; and the at least one case property constraint is enforced by the wrapper widget by adding the case property to the invalid case property list obtained from the indicated interactive document.

7. The computer-implemented method of claim 1, wherein:

the indicated interactive document imposes a dynamic rule for a metadata value for a user interface element that is associated with a case property.

8. The computer-implemented method of claim 1, further comprising:

creating a digital signature for the interactive document; and persisting the interactive document and the digital signature within a case of a case management solution of the case management environment, wherein modifiability of at least one case property is restricted, responsive to the creation of the digital signature.

* * * * *